United States Patent Office

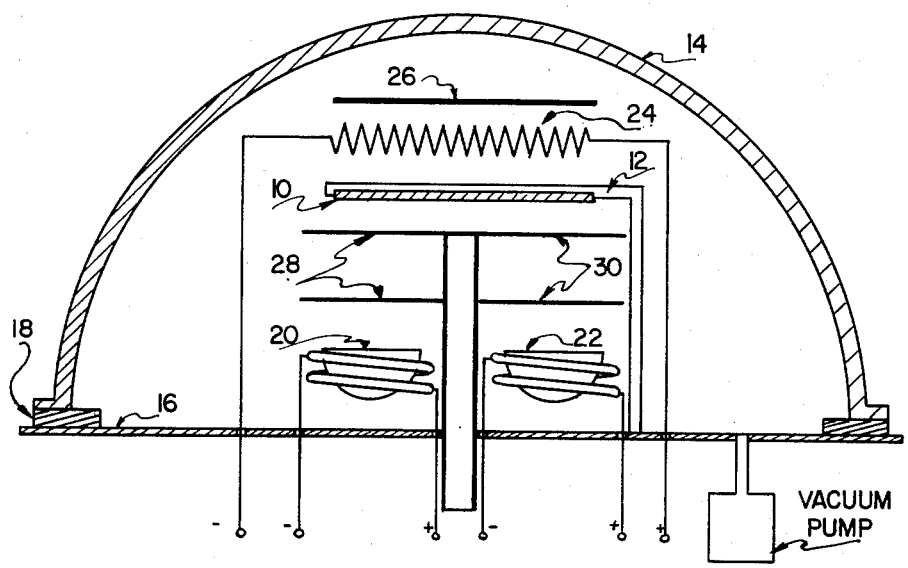

3,113,040
Patented Dec. 3, 1963

---

3,113,040
METHOD OF MAKING LUMINESCENT PHOSPHOR FILMS
Arthur W. Winston, Lexington, Mass., assignor to National Research Corporation, Cambridge, Mass., a corporation of Massachusetts
Filed Dec. 11, 1958, Ser. No. 779,784
2 Claims. (Cl. 117—213)

This invention relates to the making of phosphors and more particularly to the making of phosphors which will luminesce when placed in an electric field.

It is a principal object of the present invention to provide a process of making electroluminescent phosphors.

Still another object of the present invention is to provide a process of making electroluminescent phosphor films by vapor deposition.

Still another object of the present invention is to eliminate post evaporation treatment of phosphor films.

Still another object of the present invention is to provide a process whereby a large variety of substrates may be used for supporting luminescent phosphors.

Other objects will become apparent and the invention better understood from a consideration of the following examples and description, reference being had to the schematic drawing, which is a section through the evaporation and condensing apparatus for carrying out the invention.

Briefly stated, the invention comprises cleaning and drying the substrate which, for example, may consist of stainless steel, aluminum or conductive glass. The substrate is then inserted into the substrate holder and heated to a temperature above 80° C. Heating the substrate over 300° C. is unsatisfactory because of phase changes, interaction with the phosphor layer and reduction of film thickness. The phosphor film is deposited by vaporizing in vacuum the phosphor and an activating material simultaneously but separately, and then condensing onto the substrate. Zinc sulfide may be used, or compounds and elements which produce zinc sulfide. Activators and coactivators may be used separately or in combination to constitute the activating material. The activators which are acceptors of electrons may consist of one or more elements or compounds which can be chosen from the group I–B elements or the group V–B elements. By I–B elements, as used in the specification and claims, are meant copper, silver and gold. By V–B elements there are meant phosphorus, arsenic and antimony. Similarly, a co-activator which is a donor of electrons may be added in lieu of or in addition to the activator. The co-activator is preferably one or more elements from group III–B or group VII–B. For the purpose of the specification and claims, group III–B consists of the elements aluminum, gallium and indium. Group VII–B consists of the elements chlorine, bromine and iodine. The various activators and co-activators may be provided as elements or as compounds. In some cases, a single compound, e.g. copper chloride may furnish both an activator (copper) and a co-activator (chlorine).

*Example I*

In carrying out the process, a substrate, 10, consisting of conductive glass, which has been washed in ethyl alcohol and air dried, is placed on the adjustable substrate holder, 12, in the vacuum chamber, comprising a bell, 14, resting on a base, 16, with a gasket, 18, to make an air-tight joint. During the pumpdown, the substrate is further cleaned by exposing it to a glow discharge for a period of ten minutes. Zinc sulfide (8.0 gm.) is placed in one boat, 20, and copper (23 mg.) is placed in a second boat, 22. The boats are constructed of molybdenum and are connected to a current source which includes rheostats and ammeters so that the proper current may be applied to heat them to the desired temperature for vaporizing the contents. The substrate is heated to about 185° C. by radiation from a molybdenum strip, 24. A radiation shield, 26, is provided which assists in heating the substrate and which protects the substrate from ambient molybdenum vapor products which may evolve from the heating elements. When the pressure within the bell jar has been decreased to approximately $5 \times 10^{-5}$ mm. Hg abs., the temperature of the boat containing the zinc sulfide is raised slowly to prevent the outgassing from becoming rapid enough to eject the zinc sulfide from the boat. During this operation the upper and the lower shutters, 28, over the zinc sulfide boat, and the upper and lower shutters, 30, over the copper boat, protect the substrate from any outgassed material. The upper shutters also assist in preheating the substrate by providing a surface which, together with the molybdenum strip, 24, partially encloses the substrate. When the zinc sulfide boat temperature is about 1200° C., the shutters, 28, covering the boat, are opened.

A few minutes prior to the opening of the shutters over the zinc sulfide boat, heating is begun of the copper boat but not enough to produce any significant evaporation. Immediately after opening of the zinc sulfide shutters, the shutters, 30, over the copper boat are opened and the temperature of the boat containing the copper is raised so that the copper will be continuously evaporating during the evaporation of the zinc sulfide.

The simultaneous depositions of the constituents are controlled in the following manner: A separate evaporation is made from each boat upon test substrates at accurately-known distances and heating currents for known lengths of time. From this, the rates of evaporation are determined and the relative rates of simultaneous deposition. Evaporation may then be carried out at a predetermined current and boat-to-substrate distance to give a particular phosphor thickness and composition in a given time.

The evaporation is continued for 50 minutes with a boat-to-substrate distance of 25 centimeters to obtain a film thickness of between about 3 microns and 4 microns. After the evaporation is completed, the substrate is allowed to cool to approximately 20° C. before removing. When the phosphor film is placed in an electric field, it exhibits efficient luminescense.

*Example II*

In still another embodiment of the invention, the evaporation is carried out from a single boat using zinc sulfide which has been previously activated and made into electroluminescent powder. The zinc sulfide powder contained 0.15% copper, 0.1% chlorine and 0.02% zinc oxide and may be prepared as described in General Electric Patent No. 2,755,255. A film thickness of between 3 microns and 4 microns was deposited by using 6 gm. of said powder. In other respects, the procedure was the same and resulted in a phosphor film which luminesces when placed in an electric field.

For a substrate temperature of about 185° C., tough adherent films are obtained and when a suitable activating material is used, electroluminescent films are obtained without the need for post-baking. The invention may be used with various phosphor materials including electroluminescent powders, but it has been found particularly satisfactory for zinc sulfide and an activating material.

The present method of deposition onto heated substrates wtihout subsequent baking is more economical of time. Moreover, although the substrate is heated, the temperatures reached are relatively low, thereby eliminating the possibility of damage to the films at the high temperature used in baking. This opens the way to the use of substrates, for example, aluminum or conductive glass, which would otherwise be unsatisfactory because of phase changes or interactions with the phosphor layer at higher temperatures.

While the present invention has been described with reference to particular embodiments thereof, it will be understood that numerous modifications may be made by those skilled in the art without actually departing from the invention.

What is claimed is:

1. The method of making luminescent phosphor films comprising arranging within a vacuum chamber a substrate, heating said substrate by radiation to a temperature between about 80° C. and 300° C., simultaneously vaporizing a zinc sulfide and an activating material selected from the group consisting of copper, silver, gold, phosphorus, arsenic, antimony, aluminum, gallium, indium, chlorine, bromine, iodine, and mixtures thereof and condensing the vapors of said zinc sulfide and activating material on the surface of said substrate.

2. The method of making luminescent phosphor films comprising arranging within a vacuum chamber a conducting substrate, heating said substrate to a temperature of about 185° C., simultaneously vaporizing zinc sulfide and an activating material selected from the group consisting of copper, silver, gold, phosphorus, arsenic, antimony, aluminum, gallium, indium, chlorine, bromine, iodine and mixtures thereof and condensing the vapors of said zinc sulfide and activating material on the surface of said substrate.

References Cited in the file of this patent
UNITED STATES PATENTS

| | | |
|---|---|---|
| 2,600,579 | Ruedy | June 17, 1952 |
| 2,659,678 | Cusano | Nov. 17, 1953 |
| 2,675,331 | Cusano et al. | Apr. 13, 1954 |
| 2,709,765 | Koller | May 31, 1955 |
| 2,732,312 | Young | Jan. 24, 1956 |
| 2,732,313 | Cusano | Jan. 24, 1956 |
| 2,867,541 | Coghill et al. | Jan. 6, 1959 |
| 2,936,252 | Hanlet | May 10, 1960 |
| 2,967,111 | Coghill et al. | Jan. 3, 1961 |
| 2,996,402 | Feldman | Aug. 15, 1961 |